(12) United States Patent
Ito et al.

(10) Patent No.: US 11,455,828 B2
(45) Date of Patent: Sep. 27, 2022

(54) FACE RECOGNITION SYSTEM, FACE RECOGNITION METHOD AND FACE RECOGNITION PROGRAM

(71) Applicant: Micronet Co., Ltd., Sapporo (JP)

(72) Inventors: Kazuhiko Ito, Sapporo (JP); Makoto Sato, Sapporo (JP)

(73) Assignee: Micronet Co., Ltd., Sapporo (JP)

( * ) Notice: Subject to any disclaimer, the term of this patent is extended or adjusted under 35 U.S.C. 154(b) by 233 days.

(21) Appl. No.: 16/635,582

(22) PCT Filed: Jun. 14, 2019

(86) PCT No.: PCT/JP2019/023674
§ 371 (c)(1),
(2) Date: Jan. 31, 2020

(87) PCT Pub. No.: WO2020/230340
PCT Pub. Date: Nov. 19, 2020

(65) Prior Publication Data
US 2021/0406520 A1    Dec. 30, 2021

(30) Foreign Application Priority Data

May 13, 2019   (JP) .............................. JP2019-090719

(51) Int. Cl.
*G06V 40/16* (2022.01)
*G06V 20/52* (2022.01)
(Continued)

(52) U.S. Cl.
CPC .............. *G06V 40/166* (2022.01); *G06F 3/14* (2013.01); *G06V 10/22* (2022.01); *G06V 10/98* (2022.01);
(Continued)

(58) Field of Classification Search
None
See application file for complete search history.

(56) References Cited

U.S. PATENT DOCUMENTS

2005/0224573 A1   10/2005 Yoshizane
2007/0291998 A1   12/2007 Takizawa et al.
(Continued)

FOREIGN PATENT DOCUMENTS

CN    106600478 A    4/2017
CN    107122650 A    9/2017
(Continued)

OTHER PUBLICATIONS

Barycentric Representaion and Metric Learning for Facial Expression Recognition. Kecem et al. (Year: 2018).*
(Continued)

*Primary Examiner* — Delomia L Gilliard
(74) *Attorney, Agent, or Firm* — Browdy and Neimark, P.L.L.C.

(57) ABSTRACT

A face recognition technology that enables high-speed determination of erroneous detection of face regions and high-precision face recognition by means of a first face recognition processing unit of relatively low accuracy for detecting a face region of a person on each captured image captured by a monitor camera, and a second face recognition processing unit for performing face recognition of a person more accurately with respect to the detected face region transmitted from the first face recognition processing unit. The second face recognition processing unit determines that the first face recognition processing unit has erroneously detected when the second face recognition processing unit is not able to recognize a face region on the detected face region transmitted from the first face recognition processing unit, and the first face recognition processing unit calculates and self-learns a barycentric coordinate of the detected face
(Continued)

region as a point mask position. Thereafter, the first face recognition. processing unit checks whether or not the coordinate of the barycentric position has already been stored in a storage as one of the point mask position, and, when the coincident coordinate of the point mask position is found in the data of the barycentric coordinates, this face recognition system does not perform more accurate face recognition processing by the second face recognition processing unit, and proceeds to the next face recognition processing on the next captured image.

12 Claims, 10 Drawing Sheets

(51) Int. Cl.
  *G06V 10/98* (2022.01)
  *G06V 10/22* (2022.01)
  *G06F 3/14* (2006.01)
  *G07C 9/00* (2020.01)
(52) U.S. Cl.
  CPC ............ *G06V 20/52* (2022.01); *G06V 40/172* (2022.01); *G07C 9/00563* (2013.01)

(56) References Cited

U.S. PATENT DOCUMENTS

| | | | |
|---|---|---|---|
| 2009/0096871 A1 | 4/2009 | Kuwano et al. | |
| 2013/0010095 A1* | 1/2013 | Aoki | H04N 5/23219 348/77 |
| 2013/0142426 A1 | 6/2013 | Kaneda et al. | |
| 2015/0310673 A1 | 10/2015 | Romdhani | |
| 2015/0356348 A1* | 12/2015 | Kaneda | G06K 9/00302 382/118 |
| 2017/0124383 A1 | 5/2017 | Ohbitsu | |
| 2017/0278254 A1 | 9/2017 | Ikeda et al. | |
| 2018/0307896 A1* | 10/2018 | Tamura | G06K 9/00268 |
| 2019/0065833 A1 | 2/2019 | Wang et al. | |

FOREIGN PATENT DOCUMENTS

| | | | |
|---|---|---|---|
| CN | 107122650 B | * 12/2019 | ............ G06F 21/32 |
| EP | 1868158 A2 | 12/2007 | |
| EP | 1998567 A1 | 12/2008 | |
| JP | 2005-301539 A | 10/2005 | |
| JP | 2010-117981 A | 5/2010 | |
| JP | 2013-246601 A | 12/2013 | |

OTHER PUBLICATIONS

Mikolajczyk K et al: "Face detection and tracking in a video by propagating detection probabilities," IEEE Transactions on Patternanalysis and Machinintelligence, IEEEComputer Society, USA, vol. 23, No. 10, Oct. 1, 2003 (Oct. 1, 2003), pp. 1215-1228, XP011101847, ISSN: 0162-8828.

Qi, X. et al., "Face Recognition via Centralized Coordinate Learning", arXiv preprint arXiv:1801.05678, 17, Jan. 2018, <URL: https://arxiv.org/pdf/1801.05678.pdf>.

Kacem, et al., Barycentric Representation and Metric Learning for Facial Expression Recognition, IEEE computer society, 2018 13th IEEE International Conference on Automatic Face & Gesture Recognition, 2018, pp. 443-447.

* cited by examiner

FACE RECOGNITION SYSTEM, FACE RECOGNITION METHOD AND FACE RECOGNITION PROGRAM

TECHNICAL FIELD

The present invention relates to a face recognition system, a face recognition method, and a face recognition program for processing at high speed and with high accuracy detection of a person approaching to a reception desk and face—recognition of the person approaching only by a captured. image taken by a digital camera installed at an entrance of a company, a hotel, a condominium, and the like.

Generally, "face recognition" and "face authentication" are similar computer processing. It is used. as a. term to mean a processing technique for automatically identifying a person's face from a digital image taken by a monitor camera or the like by a computer system or an application installed therein. However, they are used in this application as different terms in the sense. First, "face detection" is performed in order to detect an region of a face by examining whether a person's face exists in a digital image obtained from a digital camera such as a surveillance camera, and when the "face detection" is succeeded, then "face recognition" processing is performed in order to analyze features of the detected face region and determine whether or not it is a face of a. certain person. And when the "face recognition" is succeeded, the "face authentication" process is performed. In the face authentication process, features of the identified face image are compared with feature data of a large number of face images registered in a database in advance determine a face image which has the same features with the feature data of the identified. face image, and extract attributes registered associated with the extracted face image. That is, it is used as a process for specifying who the person is and what the attributes of the person of the recognized face image are.

BACKGROUND ART

In recent years, automatic reception systems and security systems have been widely used in entrances of, for example, companies, hotels, condominiums, and the like, which detect the approach of a person in a captured image of a monitor camera installed therein, recognize the face of the person, open an automatic door, respond with an image monitor or sound in accordance with the recognition result, and perform other specific reactions This is because the technique of analyzing a captured image in order to specify a face of a person therein and perform some kind of reaction based on the analysis has become readily available.

When such a face recognition/face authentication technique is employed, it is necessary to specify the target person with high accuracy only from the captured image of the monitor camera, and for this purpose, the features of the face of the person must be clearly captured. in the image. Therefore, in the conventional face recognition system, in order to perform face detection. with high accuracy, constraint conditions for making the photographing conditions of the monitor camera. constant to a certain degree. For instance, the system demands a person standing in front of the camera to correct the standing position and the orientation of the face so that the face falls within a certain range, a screen as a background is placed so that uncertain elements do not enter into the background of the person, or a dedicated booth is provided. for eliminating external instability factors such as sunlight and lighting effects. Further alternatively, other operational measures such as searching for a suitable installation place in the entrance hall and installing the reception booth and the monitor camera therein are taken.

However, in the case of such operation, the design of the reception booth which. should be the "face" of the company, hotel, or the like is restricted, or the reception system is hidden. behind the reception booth because of the existence of a partition or the like, and it is difficult for a visitor who enters the entrance hall to find where the reception booth resides.

On the other hand, when an unmarried reception booth is provided in a company or the like, as shown in. FIGS. 10 and 11, the monitor camera 103 is disposed. on the reception counter 101 so as to monitor the entrance 102 direction. In this case, as seen. in. the captured image 201 shown in FIG. 11, the monitor camera 103 photographs a scene of the outside 105 through the automatic entrance door 104, or photographs a scene that changes from time to time due to a person entering or leaving from the automatic. entrance door 104, a person or a car traveling on the outside 105, or the like.

In order to automatically detect a person entering from the automatic door 104 of the entrance 102 under such a situation, it is first necessary to determine whether or not the person comes close to the reception counter 101. For this purpose, a pattern recognition process is used for face detection with respect to the captured image 201 captured by the monitor camera 103 by the computer. At the time of the pattern. recognition, a threshold value is set for distinguishing the face region of the person from the background. However, the appropriate value of the threshold also changes due to background noise, i.e., a change in the object or light of the background due to time. Nevertheless, in order to detect every person coming in without fail, it is inevitable to set the threshold value to the lowest value in consideration of all circumstances.

However, when the threshold value is set to the lowest value, many unnecessary detections and recognitions may occur depending on the situation, erroneously. In addition, when the face of a specific person is authenticated under such noisy conditions, since all the patterns of the possible face regions in the image should be checked, the time consumption problem arises in that authentication process.

As described above, in the prior art, in the face detection of a person executed during the face recognition process, if the face detection threshold value is set high in order to improve the accuracy, detection time increases and the quickness is lowered, and on the contrary, if the threshold value is set low, the quickness is improved, but there raises a problem that the system reacts to erroneously detect an image region other than the person as a face region.

In addition, an appropriate threshold value for cutting out a face region from a captured. image for face detection changes due to a change of objects of a background in the image or a change of a light entering direction. Therefore, in order to detect the face of a person without fail under various circumstances, the threshold value must be set low. However, as a result, there causes a problem that erroneous detections increase depending on the situation. At the same time, it requires hard labor and long time for a technician to determine an appropriate threshold value. In addition, if a face recognition system which executes a face recognition application with high accuracy is employed, the quickness of person detection is lowered, so as the system not to react in real time and not to be practical as a face recognition system.

In addition, there is a method of adjusting the camera position so that the unwanted portion of the background is not captured in the image taken by the monitor camera or masking it in a rectangular shape with respect to the image taken in advance. In this case, the detection region of the person is narrowed. In addition, in this case as well, there has been a problem that it requires long time and hard. labor for the technician to suitably set the masking region.

PRIOR ART DOCUMENTS

Patent Documents

PATENT DOCUMENT 1: Japanese Patent Application Laid-Open No. 2018-45309
PATENT DOCUMENT 2: Japanese Patent Publication Laid-Open No. 2018-88154
PATENT DOCUMENT 3: Japanese Publication Laid-Open No. 2018-160799

SUMMARY OF THE INVENTION

Problems to be Solved by the Invention

The present invention has been made in view of the above-mentioned problems of the prior art, and it is an object of the present invention to provide a face recognition system which, when incorporated in an automatic reception system installed in a reception counter of an entrance hall such as a company, a hotel, or a condominium, instantly senses the approach of a person who has entered the entrance door of the entrance hall, and can perform face recognition with high accuracy. It is also an object of the present invention to provide a face recognition method and a face recognition program which can realize the function set forth above by a computer.

It is another object of the present invention to provide a face recognition system capable of increasing the accuracy of approaching detection of a person by an automatic learning function by operation, a face recognition method and a face recognition program capable of realizing the function by a computer.

Means for Solving the Problems

One of the aspect of the present invention is a face recognition system comprising: a monitor camera for continuously capturing to get a plurality of captured images of a given monitoring space at a given angle of view; a first face recognition processing unit of a relatively low-precision for continuously performing face recognition to detect a face region on each of the captured images; a second face recognition processing unit of a relatively high-precision for performing face recognition on the detected face region by the first face recognition processing unit; a coordinate of barycentric position determining unit for continuously determining a coordinate of a barycentric position of each detected face region by the first face recognition processing unit; a point mask learning unit for, when the second face recognition processing unit fails to recognize a face from the detected face region by the first face recognition processing unit, storing the coordinate of the barycentric position corresponding to the detected face region as a data of coordinate of barycentric position; a point mask check processing unit for, when the first face recognition processing unit detects a face region on one of the captured images but the second face recognition processing unit fails to recognize a face on the detected face region, checking if there is a data in the stored data of the coordinates of the barycentric positions which coincides with the determined coordinate of the barycentric position, and when the coincident data of the determined coordinate of the barycentric position is found, then prohibiting the second face recognition processing unit to perform face recognition on the same captured image as an erroneously detected face region; and a face recognition result output unit for outputting a face recognition result when the second face recognition processing unit successfully recognizes a face.

The face recognition system of the above invention further comprises: a monitor screen installed in a reception booth with the monitor camera and connected with this face recognition system; a face authentication processing unit for specifying a person using a face recognition result output from the face recognition result output unit; and an automatic reception processing unit for displaying on the monitor screen a welcome message corresponding to a face detection by the first face recognition processing unit and a welcome message corresponding to an attribute of a person specified by the face authentication processing unit.

In the face recognition system of the above invention, it is possible that the automatic reception processing unit is configured to output an open signal of a security door according to the attribute of the person. specified by the face authentication processing unit.

In the face recognition system of the above invention, it is possible that a computer of an external face recognition service site connected via the Internet is used as the second face recognition processing unit.

Another aspect of the present invention is a face recognition method, which is to be executed by a computer system, comprising: a camera image capturing step in which a monitor camera continuously captures a plurality of captured images of a given monitoring space at a given angle of view; a first face recognition processing step of continuously performing face recognition with a relatively low-precision to detect a face region on each of the captured images; a second face recognition. processing step of performing face recognit on with relatively high-precision. on the detected face region in the first face recognition processing step; a coordinate of barycentric position determining step of continuously determining a coordinate of a barycentric position of each detected face region in the first face recognition processing step; a point mask learning step of storing the coordinate of the barycentric position corresponding to the detected face region as a data of the coordinate of the barycentric position when the second face recognition processing step fails to recognize a face from the detected face region in the first face recognition processing step; a point mask check processing step of checking if there is a data in the stored data of the coordinates of the barycentric position which coincides with the determined coordinate of the barycentric position when the first face recognition processing step detects a face region on one of the captured images but the second face recognition processing step fails to recognize a face on the detected face region, and prohibiting the second face recognition processing step from performing face recognition on the same captured image as an erroneously detected face region when the coincident data of the determined coordinate of the barycentric position is found; and a face recognition result output step of outputting a face recognition result when the second face recognition processing step successfully recognizes a face.

The face recognition method of the above invention further comprises: a face authentication processing step of specifying a person by using the face recognition result output; and an automatic reception processing step of displaying on a monitor screen a welcome message corresponding to the face detection by the first face recognition processing step and a welcome message corresponding to an attribute of a person specified by the face authentication processing step.

In the face recognition method of the above invention, it is possible that the automatic reception processing step outputs an open signal of a security door according to the attribute of the person specified in the face authentication processing step.

In the face recognition method. of the above invention, it is possible that, in the second face recognition processing step, a computer of an external face recognition service site connected via the Internet is used for performing face recognition on the detected face region in the first face recognition processing step.

Another one aspect of the present invention is a face recognition program running on a computer system comprising: a camera image capturing step in which a monitor camera continuously captures to get a plurality of captured images of a given monitoring space at a given angle of view; a first face recognition processing step in which a first face recognition processing unit of a relatively low-precision continuously performs face recognition to detect a face region on each of the captured images; a second face recognition processing step in which a second face recognition processing unit of a relatively high-precision performs face recognition on the detected face region in the first face recognition processing step; a coordinate of barycentric position determining step in which a coordinate of barycentric position determining unit continuously determines a coordinate of a barycentric position of each detected face region in the first face recognition processing step; a point mask learning step in which, when the second face recognition processing unit fails to recognize a face from the detected face region. in the first face recognition processing step, a point mask learning unit stores the coordinates of the barycentric positions corresponding to the detected face regions as a data of the coordinates of the barycentric positions; a point mask check processing step in which, when the first face recognition processing step detects a face region on one of the captured images but the second face recognition. processing step fails to recognize a face on the detected face region, a point mask check processing unit checks if there is a data in the stored data of the coordinates of the barycentric positions which coincides with the determined coordinate of the barycentric position, and when the coincident data of the determined coordinate of the barycentric position is found, then prohibits the second face recognition processing step to perform face recognition on the same captured image as an erroneously detected face region; and a face recognition result output step in which a face recognition result output unit outputs a face recognition result when the second face recognition processing step successfully recognizes a face.

The face recognition program of the above invention further comprises: a face authentication processing step in which a face authentication processing unit specifies a person using a face recognition result output from the face recognition result output step; and an automatic reception processing step in which an automatic reception processing unit displays on a monitor screen a welcome message corresponding to the face detection by the first face recognition processing step and a welcome message corresponding to an attribute of a person specified by the face authentication processing step.

In the face recognition program of the above invention, it is possible that, in the automatic reception processing step, the automatic reception processing unit is configured to output an open signal of a security door according to the attribute of the person specified by the face authentication processing unit.

In the face recognition program of the above invention, it is possible that, in the second face recognition processing step, a computer of an external face recognition service site connected via the Internet is used for performing face recognition on the detected face region in the first face recognition processing step.

Effects of the Invention

According to the face recognition system of the present invention, the face recognition method of the present invention and the computer which executes the face recognition program of the present invention, if they are installed on an entrance reception counter of a hotel, a company, a condominium and the like, the approach of a person entering the entrance door to the entrance hall can be accurately detected at high speed, and the face recognition of the person can be performed with high accuracy.

Also, according to the face recognition system of the present. invention, the face recognition method of the present invention and the computer which executes the face recognition program of the present invention, it is possible to improve the response speed while increasing the accuracy of the approach detection of the person by the automatic learning function during operation.

Therefore, the automatic reception system incorporating the present invention is possible to classify whether or not the camera image of the entire entrance hall captures a person approaching the system at the initial stage, without setting up a partition as a background or restricting a region for face detection, or giving an instruction to a visitor to move to an optimum position so as to be seen from the camera. Also, the system is possible to automatically self-learn an erroneous recognition element existing in the background which is erroneously recognized as a face of a person during the operation of this system. When the same element as the stored erroneous recognition element is erroneously recognized as a person in the captured image of the monitor camera, it stops performing further face recognition process. Therefore, the system is possible to perform automatic reception processing only for a correctly detected lace region of a person in the captured image both by the low-precision recognition and the high precision recognition, thereby the system. can quickly and correctly execute the automatic reception processing.

DESCRIPTION OF THE PREFERRED EMBODIMENTS

The present invention premises to use the calculation result of the face recognition computer system which can vary the face recognition accuracy by varying threshold value, or to use a plurality of face recognition computer systems having different face recognition accuracies at the same time. It is also permitted to use LAN and the Internet communication technologies for realizing these.

Embodiments of the present invention will be described below in detail with reference to the drawings.

First Embodiment

The first embodiment is an automatic reception system featured in which face recognition processing is performed by using two kinds of threshold values such as a first low threshold value and a second high threshold value. By using the first threshold value, the face recognition performing speed is rapid but the recognition accuracy is low. On the other hand, by using the second threshold value, the face recognition performing speed is relatively slow but the accuracy is high. The first embodiment is also applicable to a face recognition method which is used in the automatic reception system and a face recognition program which is executed in the automatic reception system.

Figure 1:
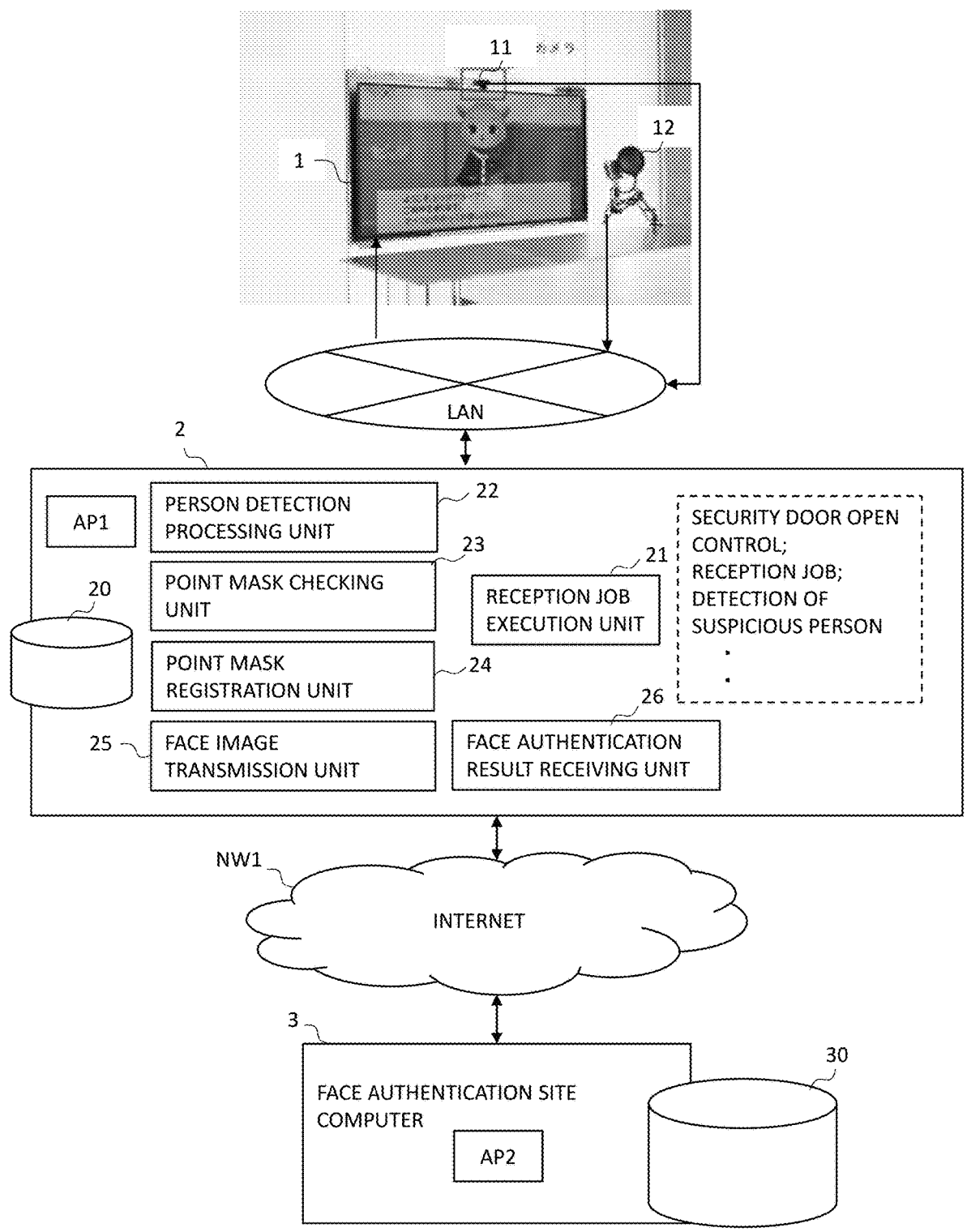
FIG. 1 is a functional block diagram of an automatic reception system of a first embodiment of the present invention.

As shown in FIG. 1, the automatic reception system according to the present embodiment uses both LAN and the Internet, and this system is composed of a monitor screen 1 installed in. a reception booth, a local site computer 2 connected to the monitor screen 1 by LAN, and a face authentication site computer 3 connected to the local site computer 2 through the Internet NW1.

The monitor screen 1 is connected to a monitor camera 11. having an angle of view capable of capturing a scene from an entrance door to a reception booth in order to continuously capture visitors coming through the entrance door, a microphone 12 for picking up speeches of the visitors, and a speaker (not shown, not absolutely necessary) for audio output of necessary messages.

The local site computer 2, which may be a notebook or desktop personal computer or a high-performance computer for a business, has a data communication function for communicating data with an external computer through the LAN or the Internet NW1, and a storage device 20 having a suitable capacity. An automatic reception job program for performing the automatic reception processing of the present embodiment is installed. The automatic reception job program also includes a face detection program for executing face recognition at a first threshold value with a relatively low accuracy required by the local site computer 2.

The local site computer 2 includes, as internal processing functions, a reception job execution unit 21, a person detection processing unit 22, a point mask checking unit 23, a point mask registration unit 24, a face image transmission unit 25 to the outside and a face authentication result reception unit 26 from the outside.

Figure 5:
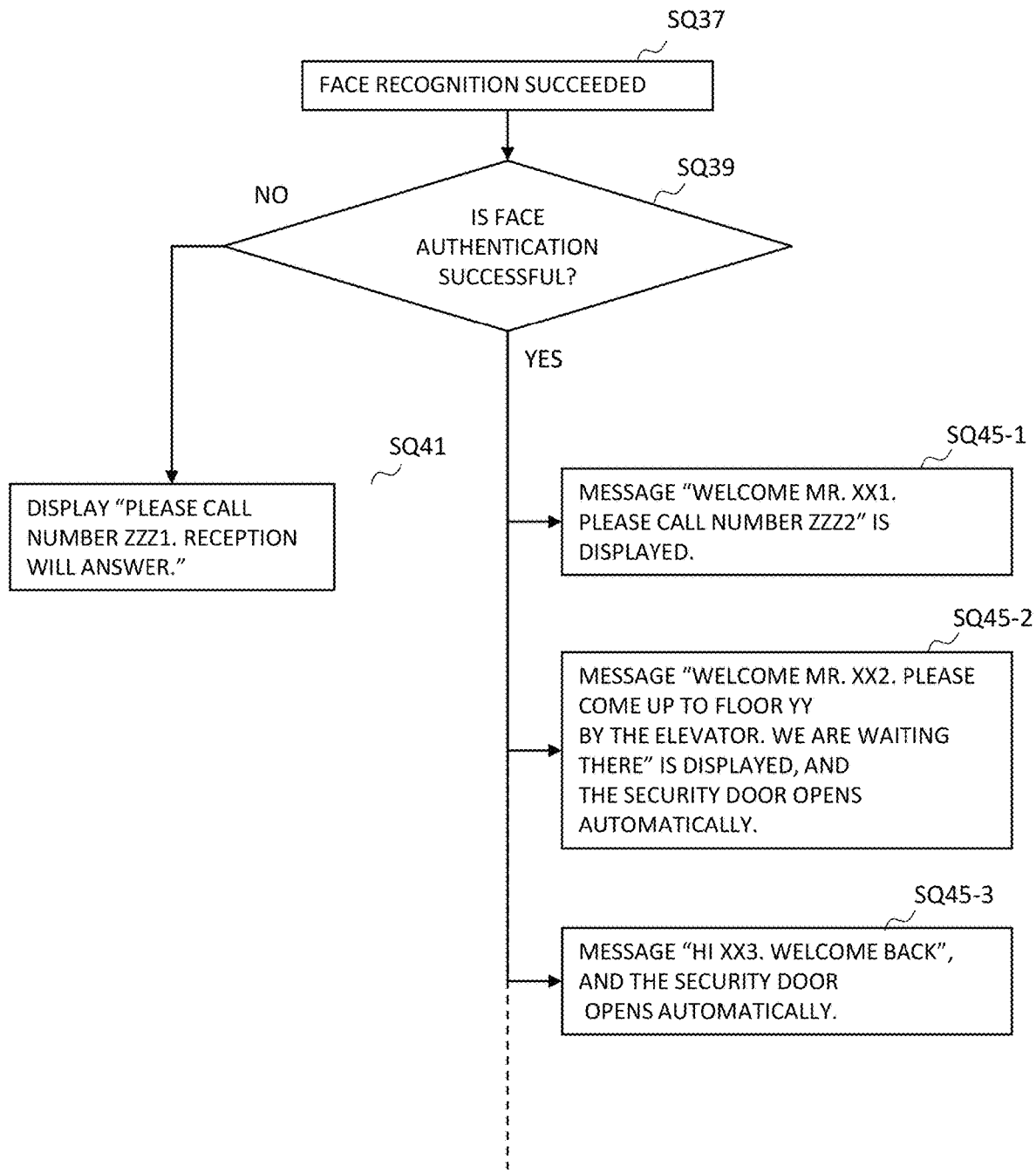
FIG. 5 is an explanatory diagram of a display of a monitor screen in the automatic reception. system of the first embodiment.

The reception job executing unit 21 in the local site computer 2 executes the visitor response job by displaying a welcome message, an response message and the like on the monitor screen 1. The messages transmitted to the monitor screen 1 through the LAN to display thereon are not particularly limited. But the messages as shown in FIG. 5 are displayed prior to the face authentication of the visitor, and also according to the face authentication result. It also receives voice signals from the microphone 12 and transmits audio signals to the speaker (not shown).

The person detection processing unit 22 runs an first face recognition application AP1 with a first threshold of a relatively low value, and performs face recognition processing with relatively low accuracy but quick responsiveness due to the first threshold. The person detection processing unit 22 performs face detection process on each of the captured images continuously sent from the monitor camera 11 through the LAN at a predetermined cycle (at a constant frame rate) to determine whether or not a face of a person is present in the image, and a face detection signal is output at the time of face detection. By setting on the relatively low first threshold value to the face detection processing unit 22, the face detection processing can recognize a human face or the like on the captured image with relatively low accuracy, so that the face detection processing is performed at a relatively high speed without placing a heavy load on the CPU.

When receiving the face detection signal from the person detection processing unit 22, the point mask checking unit 23 calculates a coordinate of a barycentric position of the detected face region and checks the coordinate with the point mask data group registered in the storage device 20. When a coincident coordinate of the barycentric position is not registered, the face image transmission unit 25 sends the image data of the face region to the external face authentication site computer 3 through the Internet NW1.

The face image transmission unit 25 transmits the face image for which the point mask checking process has not succeeded in the point mask. checking unit 23 to the external face authentication site computer 3 through the Internet NW1. The face authentication result receiving unit 26 receives the face recognition/face authentication result transmitted from the external face authentication site computer 3 through the Internet. NW1, and transfers the face recognition/face authentication result to the reception job executing unit 21 and the point mask registration unit 24.

When the recognition result indicating that the face recognition has failed is received. from the face authentication site computer 3, the point mask registration unit 24 registers the coordinate of the barycentric position of the detected face region as a new point mask data in the storage device 20.

The face authentication site computer 3 is a high-performance computer installed in a specific website to provide face recognition and face authentication services with high accuracy, and is provided with a large-capacity storage device 30. A face recognition and a face authentication application AP2 capable of performing high-precision face recognition and face authentication is installed in the face authentication site computer 3. In this face authentication site computer 3, a face recognition process with high accuracy is performed on the face image transmitted. from the local site computer 2 through the Internet NW1. That is, a person having the face feature data corresponding to the face recognized by the face recognition. processing is identified by checking the face recognized by the face recognition processing with a large number of pieces of face feature data registered in the storage device 30, and if the face authentication is successful, the face authentication result is transmitted to the requesting local site computer 2 through the Internet NW1.

In the present embodiment, the first face recognition application AP1 is installed in the local site computer 2, and the face authenticating application AP2 is installed in the external face authentication site computer 3. The face recognition application AP1 of the local site computer 2 is a relatively simple program, and therefore the face detection accuracy is relatively low but the face detection speed. is relatively high.

On the other hand, the face authenticating application AP2 of the external face authentication. site computer 3 is such that a higher face recognition/face authentication accuracy compared to the face recognition application AP1 of the local site computer 2. That is, if the captured images are to be sent to the external face authentication site computer 3 through the Internet NW1 so that the face recognition/face authentication processing is performed only by the face authentication application. AP2 on the external site computer 3, and that the local site computer 2 executes the automatic reception response after waiting for the face recognition/face authentication result from the external computer 3, it causes the visitors to perceive slowness of transition speed (reaction speed) of the monitor screen 1 compared with the response by the real receptionist. Alternatively, if the high-precision face authenticating application AP2 is to be installed and executed in the on-site local site computer 2, then it becomes to require high-speed performance for the local site computer 2, and as a result, the system cost of the local site computer 2 becomes expensive.

The details of an automatic reception operation of this automatic reception system is described hereinafter with reference to the flowchart of FIG. 2, the sequence diagrams of FIGS. 3 and 4, and the operation explanatory diagrams of FIGS. 5 to 8. This operational description is also a description of a face recognition method realized by a computer and a face recognition program to be executed by a computer.

Figure 3:
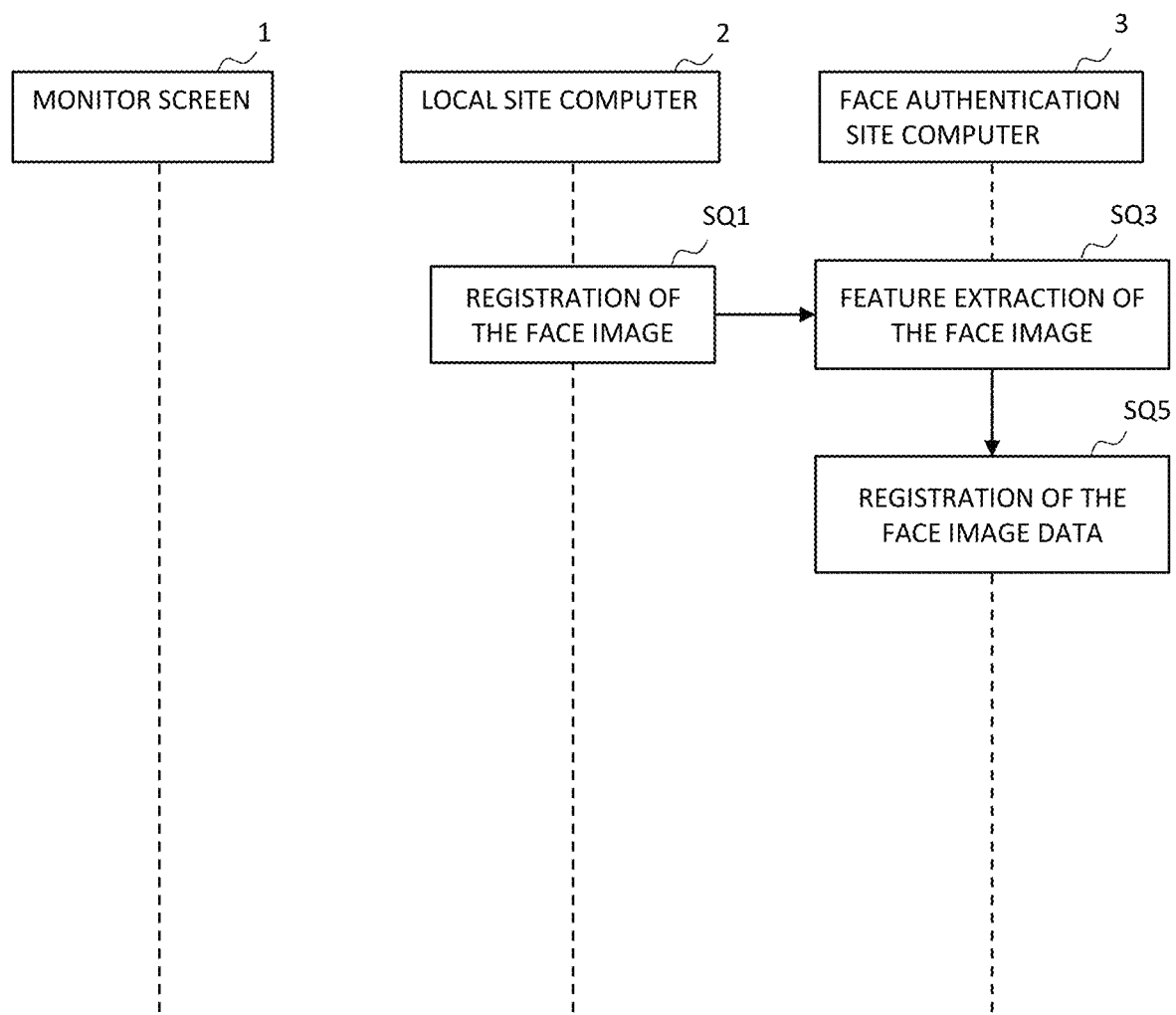
FIG. 3 is a sequence diagram of a face image registration processing executed by the automatic reception system according to the first embodiment.
Figure 4:
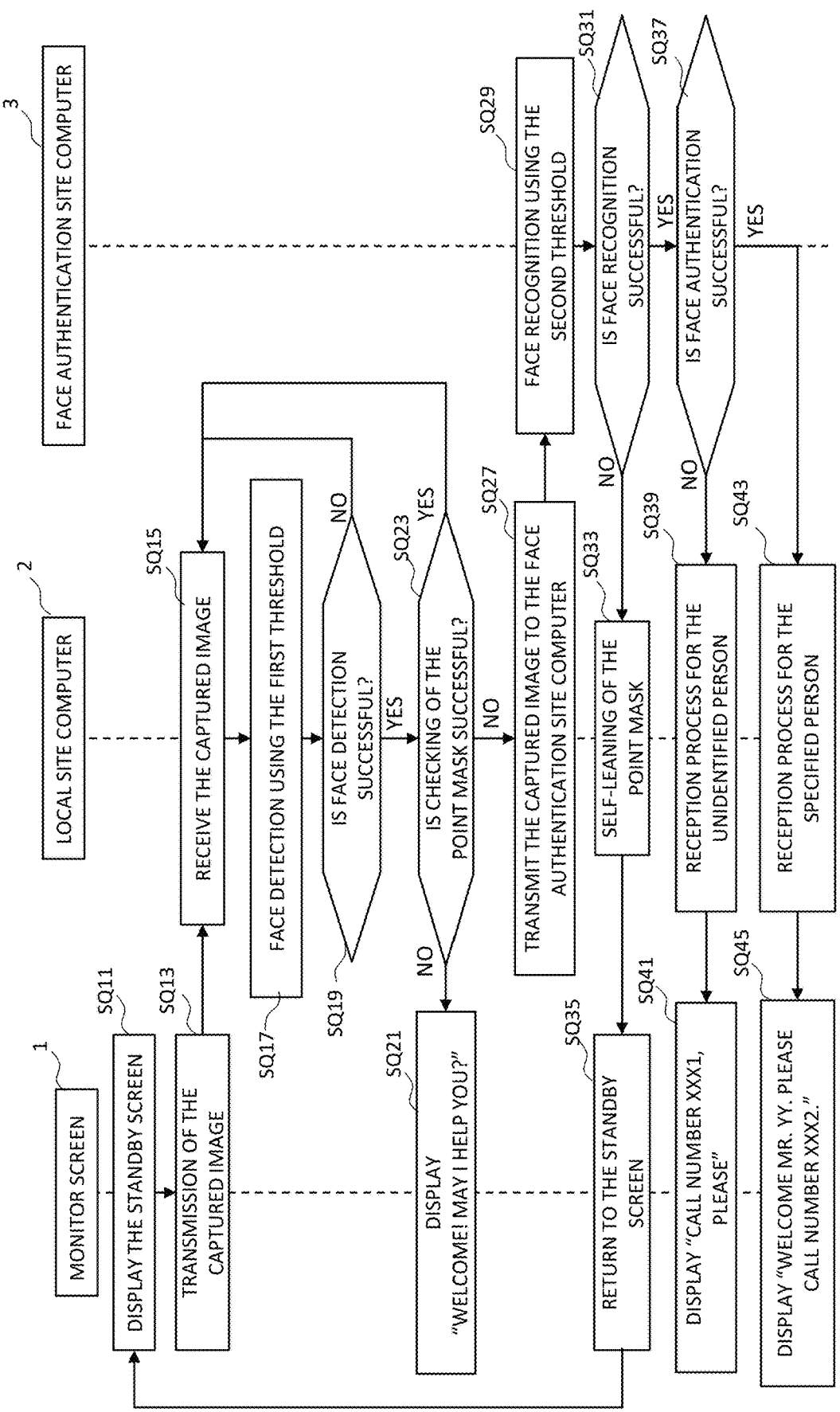
FIG. 4 is a sequence diagram of an automatic reception processing executed by the automatic reception system of the first embodiment.

As shown in the sequence diagram of FIG. 3, the local site computer 2 reads a large number of face images of persons who are expected to visit before and during the operation of the system, and transmits them to the face authentication site computer 3 (sequence SQ1). In the face authentication site computer 3, feature analysis of each face image transmitted from the local site computer 2 is performed, attribute data of the person of the face image is registered together with the feature data in the face image database of the storage device 30, and the face image feature data is accumulated (sequences SQ3 and SQ5). Since the face authentication site computer 3 receives the same face image data from each of a plurality of customers. The face image database is registered separately for each customer. After registering a certain number of face image data as preprocessing, the automatic reception system starts operation.

In the present automatic reception system, after the operation is started, automatic reception job is executed. together with automatic self-learning of the point mask. As shown in the flow chart of FIG. 2 and the sequence diagram of FIG. 4, the local site computer 2 displays the standby screen on the monitor screen. 1 (sequence SQ11). The monitor camera 11 captures images of the entrance hall scene under the capturing conditions of fixed angle of view and fixed focal length at a constant cycle (at a constant frame rate), and continuously transmits the captured images to the local. site computer 2 (step ST11, sequence SQ13). This captured images are the same as the captured image 201 of FIG. 11 used in the description of the conventional example.

It is desirable to immediately detect whether or not a person is present in one of the captured images 201 continuously captured by the monitor camera 11 before the system succeeds to specify the person who is coming from the entrance. Therefore, the local site computer 2 executes the application AP1, in which the low first threshold. value is set, to detect a person's face in the captured image 201 of the entrance hall scene (steps ST11~ST15, sequences SQ15~SQ19). By setting the face detection threshold value low, it is possible to quickly detect whether or not something looks like a person's "face" appears in the captured image.

If no face detected, the face detection processing is similarly repeated for the captured image of the following cycle (to be branched to "NO" in each of step ST15 and sequence SQ19). On the other hand, if the face detection succeeds in step ST15 and also in sequence SQ19, the process branches to "YES", and the process proceeds to step ST17 and sequence SQ23 of the point mask checking process.

In the point mask checking step ST17, the coordinate of the barycenter posit on of the detected face region is calculated, and it is checked whether or not the coordinate of the barycenter position of the face region coincides with any coordinate in the coordinate group of the point mask positions registered in the storage device 20 of the local site computer 2. Then, if the point mask position whose coordinate coincides is found, it is determined that the detected face region is not a true face region and it is erroneously detected and no person is coming-in, and the process returns for the next face detection processing for the subsequent captured image 201 (branches to "YES" in step ST19, and also in sequence SQ23). On the other hand, if the coordinate of the point mask position checking fails, a welcome message such as "Welcome, may I help you?" is displayed on the monitor screen 1 (sequence SQ21).

As a result, when an image including a region that is erroneously recognized as a face region is captured, the local site computer 2 needs not transmit the image of the face region to the external face authentication site computer 3 through the Internet NW1 for face authentication therein. Therefore, the local site computer 2 can determine that the face image is erroneously detected without long time lag and quickly prepare for a subsequent process.

With respect to the captured image in which a face region is correctly detected by the local site computer 2, the image of the face region is transmitted to the external face authentication site computer 3 through the Internet NW1, and the face recognition and face authentication process with high accuracy using the second threshold value is executed by the application AP2 (steps ST21~ST33 and sequences SQ27~SQ45). That is, in the face authentication site computer 3, an application AP2 for performing highly accurate face recognition and face authentication on each captured image of the face region received from the local site computer 2 is executed to carry out face authentication. Feature parts such as eyes, eyebrows, mouth, and nose are detected from the image of the face region, and a face image having analogous feature parts is extracted from the storage device 30 by referring to feature data of a large number of face images registered therein for each client of the local site computer 2 (step ST21, and sequences SQ27 and SQ29).

If it is determined that the face image received from the local site computer 2 is not the face image of a person in the face recognition process of the step ST21 and the sequence SQ29 in the face authentication site computer 3, the recognition result indicating that the face image cannot be recognized is transmitted from the face authentication site computer 3 to the local site computer 2 (branches to "NO" in step ST23 and sequence SQ31).

When the local site computer 2 receives the face recognition. unsuccessful signal from the face authentication site computer 3, it is determined that the face detection by the first threshold value performed using the face detection application AP1 in the step ST13 and the sequence SQ17 is erroneous detection. Then, the coordinate of the barycentric position of the face image in the captured. image is calculated, and this is regarded as a point to be erroneously detected by the face detection application AP1 of the local site computer 2. The coordinate of the barycentric position is set as a point mask coordinate for masking so as not to recognize as a face region from the next time, and this point mask coordinate is additionally registered to the data of the point mask coordinates in the storage device 20 (step ST25, sequence SQ33). Then, the local site computer 2 returns the display of the monitor screen 1 to the standby state (sequence SQ35).

In the face authentication site computer 3, if the face recognition by the face authentication application AP2 succeeds in the step ST21 and the sequence SQ29, the face authentication is performed based on the features of the face image to determine whether or not the face is a face of an already-registered person (step ST27 and sequence SQ37). If it is not possible to extract the attribute of one of the company's employees, one of the customers or that of already registered some other person, the reception response preset as an unknown visitor is executed (steps ST29 and ST31, sequences SQ39 and SQ41). On the other hand, if it is possible to identify a registered known person in the face authentication processing, the preset reception response according to the attribute is executed (steps ST29 and ST33, sequences SQ43 and SQ45).

Thus, if the face authentication is not successful in the steps ST27 and ST29 and the sequence SQ37, as exemplified in the sequence SQ41 of FIG. 5, the face authentication site computer 3 notifies the local site computer 2 of the failure of the authentication, and the local site computer 2 sends a message to the monitor screen 1 such as "Please call No. ZZZ1. Reception will answer." By displaying the message and simultaneously outputting a similar audio message from the speaker (not shown) if necessary, even an unspecified person is politely accepted.

On the other hand, if the face authentication is successful in the steps ST27 and ST29 and the sequence SQ37, the face authentication site computer 3 sends to the local computer 2 the name, ID and other registered attribute information of the specified. person. The local site computer 2, based on the attribute information received from the face authentication site computer 3, reads the attribute data of the relevant person who is registered in the storage device 20, and identifies that is a customer named by Mr. XX1 or XX2, an employee named by XX3 of the ZZZ portion of the company. Then, the reception response set in advance according to the contents of the registered. attribute information is implemented. For example, as shown in. FIG. 5, it is possible to display a message such. as "Welcome Mr. XX1. Please call No. ZZZ2" on the monitor screen 1 (Sequence SQ45-1). Also, it. is possible to display a message "Welcome Mr. XX2. Please come up to floor YY by the elevator. We are waiting there", and automatically open the security door (sequence Q45-2). Furthermore, it is possible to display a message "Hi Mr. XX3. Welcome back", and automatically open. the security door if the identified person is an employee of the company (sequence SQ45-3).

This is the first embodiment of the present invention of the automatic reception system and method, and the face recognition program to be executed on the system. According to the present embodiment, while the scene of the entrance hall 102 is captured by the monitor camera 11 at a constant field angle and focal length at a constant cycle, the local site computer 2 carries out the face detection processing which is fast in processing speed but low in accuracy by using the first threshold value which is relatively low. When the erroneous detection of the face detection occurs according to the capturing condition and capturing area, the local site computer self-leans and stores the coordinate of the barycentric position of the erroneously detected face region as the point mask coordinate. By this automatic learning processing of the point mask described above, when a face is detected in the same region in a captured. image obtained at other time, it is immediately determined solely by the local site computer 2 that the face is erroneously detected, and the time required to perform strict face recognition and face authentication by transmitting data of the face region to the face authentication site computer 3 can be omitted. At the same time, by automatically learning every coordinate of the barycentric position of the erroneously detected face regions as point mask coordinate data, its possible to reduce the number of times of strict face recognition and face authentication processing by the face authentication site computer 3, and it is possible to improve the reaction speed of the reception processing with the elapse of the operation time.

Figure 6:
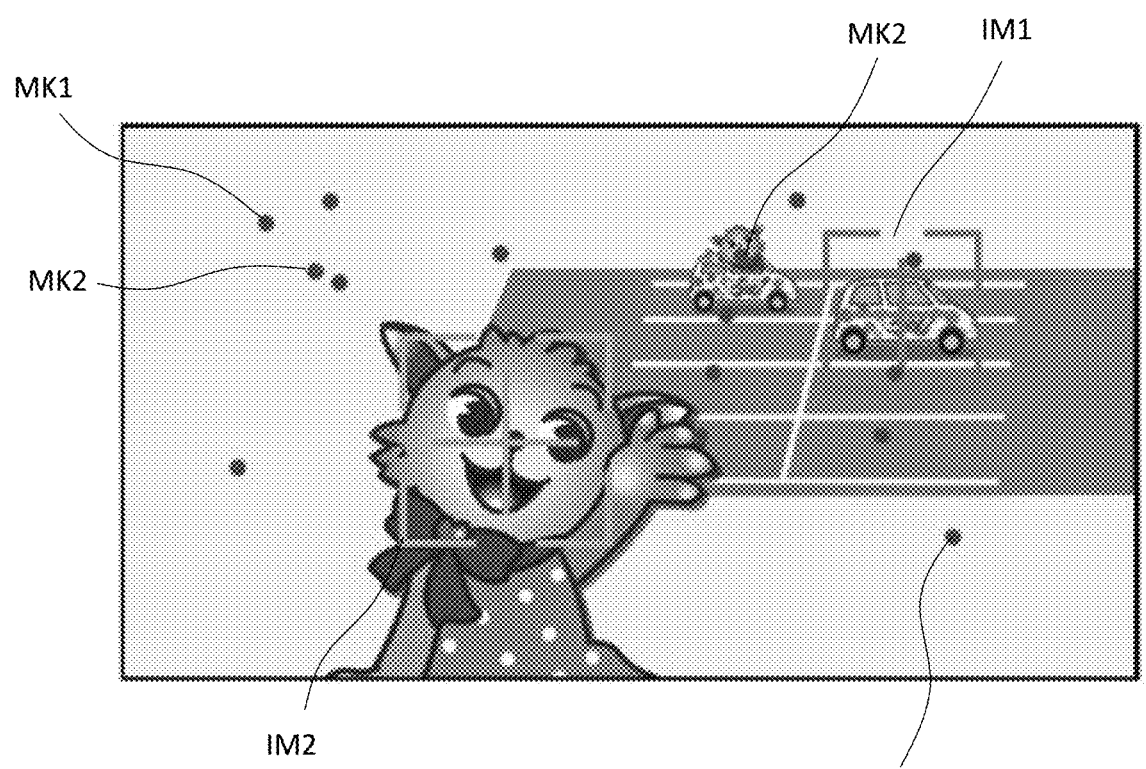
FIG. 6 is an explanatory diagram showing operations of automatic learning of point masks and a face recognition processing by the automatic reception system according to the first embodiment.
Figure 11:
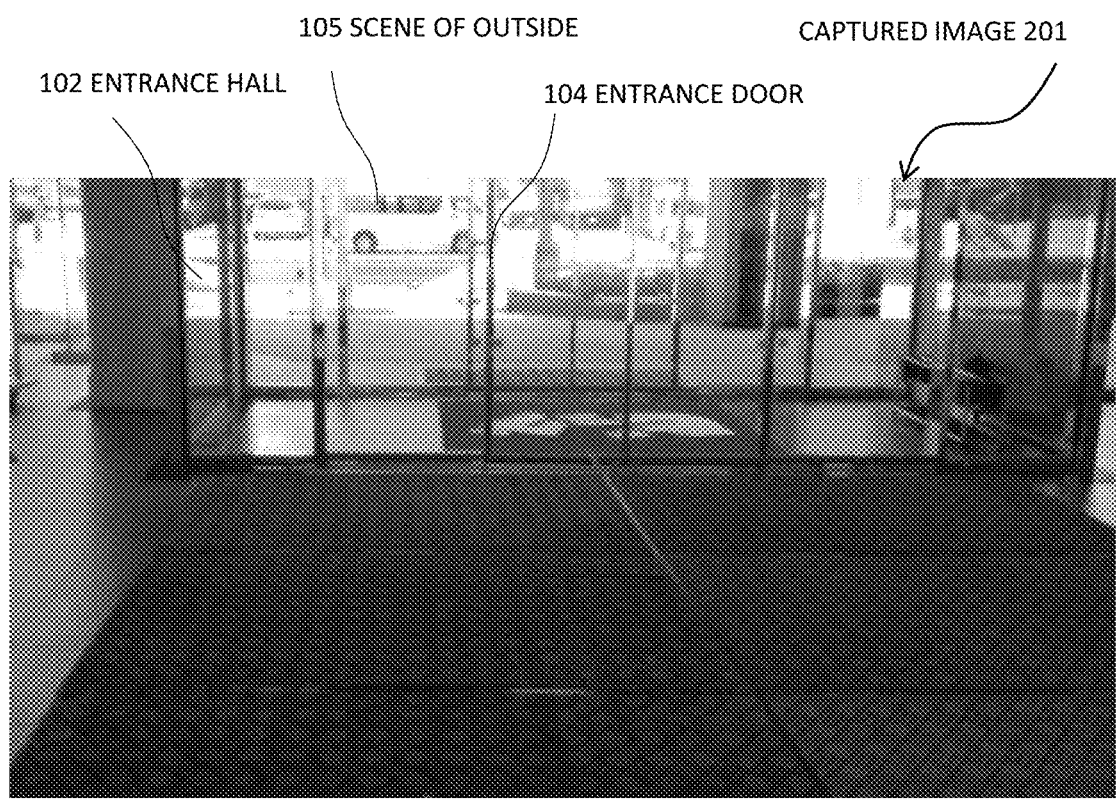
FIG. 11 is a captured image by a monitor camera of a general entrance hall.

For example, suppose that the monitor camera 11 periodically captures the captured. image 201 of the scene of the entrance hall 102 as shown in FIG. 11. As shown in FIG. 6, a coordinate list of barycentric positions of "no face detected" regions is generated. as the point masks MK1 each of which corresponds to a pixel area of the captured image 201. At initial stage, the coordinate list of the point masks MK1 is set empty or to some extent number depending on the installation location of the monitor camera 11. Conventionally, in the captured image 201 of the entrance hall 102 of FIG. 11, for example, a place where a tire of a car in the outdoor 111 and a vicinity of a mark of the automatic entrance door 101 are erroneously recognized as a "human eye" in an existing face detector, but these erroneous detections can be prevented in the present embodiment. It is also possible to exclude a certain rectangular range from, the recognition range as a background mask of the prior art, but this ordinal technic significantly restricts the range to be captured by the monitor camera 11.

Figure 7:
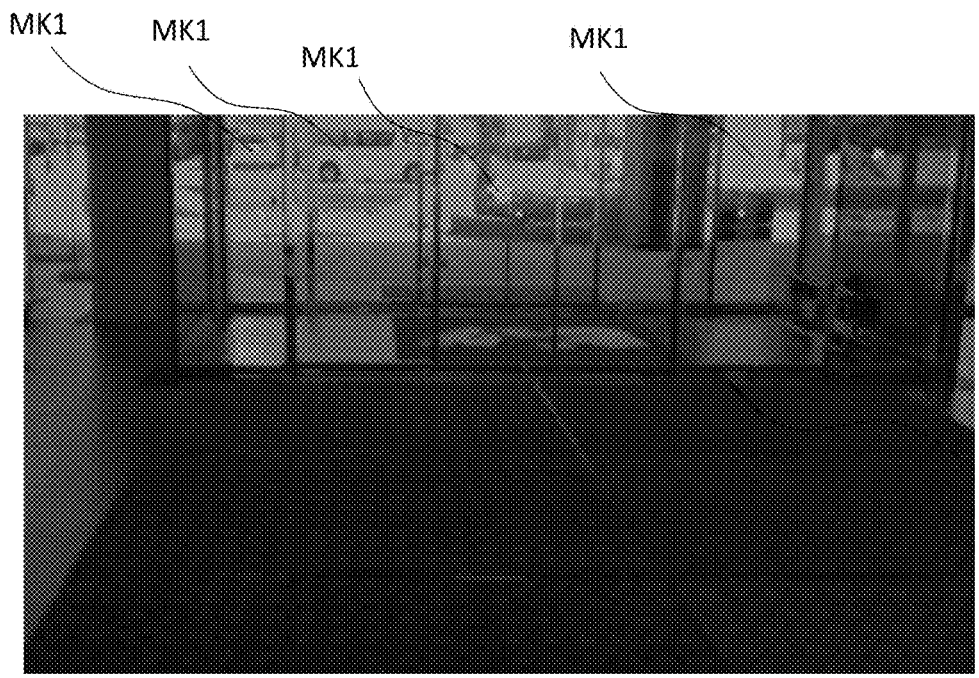
FIG. 7 is one of the images obtained by superimposing the position of the automatically learned point masks on the captured image of the entrance hall captured by the monitor camera in the automatic reception system according to the first embodiment.
Figure 8:
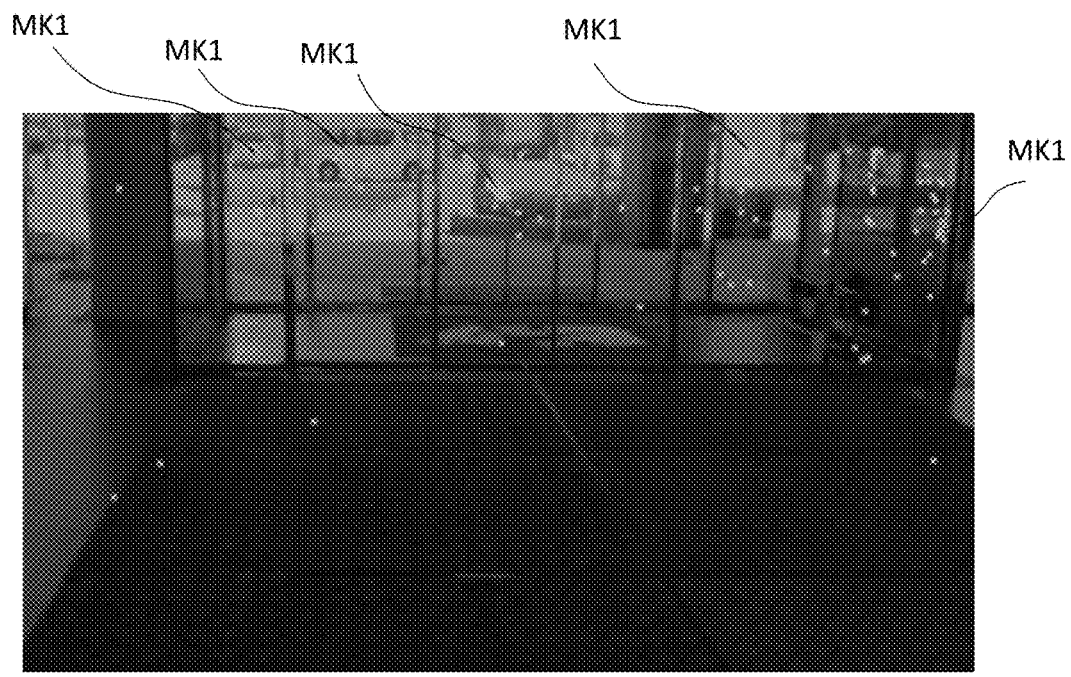
FIG. 8 is other one of the images obtained by superimposing the position of the automatically learned point masks on the captured image of the entrance hall captured by the monitor camera in the automatic reception system according to the first embodiment

Therefore, in the present embodiment, as shown in FIG. 6, the coordinates of the barycentric positions of the face rectangular patterns recognized in the camera images 201 are used, and every coordinate of the barycentric position is recorded as the "point mask" MK1 as shown in FIG. 7. Thereafter, even if a face rectangular pattern is detected at the position of the point mask MK1, the face pattern is regarded as not actually being a human face, and the face authentication processing is not performed, so that the false recognition rate is reduced. In addition, if it is judged that the face region is erroneously detected in highly accurate face recognition as in the case of newly detected face region IM1, the coordinate of the barycentric position of the face region IM1 is self-learned as a point mask MK2, and thereafter, the face region corresponding to this point mask MK2 is set as a region not to be carried out for face detection. As a result of this self-learning, as shown in FIG. 8, the number of the point masks MK1 corresponding to the erroneously detected face regions increases with time. As a result, since the erroneously detected positions are automatically recorded by operating for a long time, the face recognition and face authentication process can be performed with high accuracy only for the face detection region IM2 having a low possibility of erroneous detection as shown in FIG. 6, so that the accuracy of the face recognition and face authentication can be improved.

This is unlike the general "rectangular mask" which is used for eliminating the noise factor. For the present embodiment, even if the self-learning advances and the number of mask regions increases, the pixel areas each corresponding to the coordinate of the barycentric position of the erroneously detected region of the captured image are to be used as a point-like mask as shown in FIGS. 7 and 8. Therefore, the detection range is not narrowed with time. As a result, the face authentication with high speed and high accuracy can be achieved even if the monitor camera 11 is installed under bad conditions such that various patterns are reflected on the background.

In an environment such as the entrance hall 102, it is difficult to specify how and from which. direction the person approaches the reception counter 101, such as right or left, or from a distant position. But the present embodiment can solve the problem of avoiding restricting the flow line of visitor approaching the reception desk. In addition, when the detection accuracy is increased by raising the threshold value of face recognition from the beginning, the recognition processing load is generally increased by the increase in accuracy, and the recognition speed is lowered and the reaction characteristic is impaired. By contrast, in the present embodiment, the processing can be performed with low accuracy but high speed at the time of detecting the face of a person, and therefore, the problem related to the reaction characteristic can be solved. In addition, since the number of point masks naturally increases due to automatic self-learning as the operation time elapses, the erroneous detection region can be eliminated with good reactivity. So, the face recognition and face authentication processing can be limited to the true face detection region, thereby improving the accuracy as well as the readiness.

As described above, according to the automatic reception system, the face recognition method and the face recognition program used in this reception system of the present embodiment, it is possible to appropriately perform an action such as opening a security door to a specific person or giving a friendly guidance by using the automatic reception system at a higher speed and with a higher accuracy, and further, there is an advantage that the processing speed is improved with the elapse of the operation time.

As a result of this automatic reception, when an actual person enters the entrance hall 102 through the automatic entrance door 104 and approaches the reception counter 101, a welcome message such as "Welcome, may I help you" is displayed on the screen of the monitor screen 1, and thereafter, after success of face recognition or face authentication, such message as "Welcome Mr. XX1. Please call the number ZZZ2" is displayed. So that, there is also an advantage that a natural-like reception flow can be automatically performed.

In the present embodiment, Amazon Web Service provided by Amazon.com Corporation is used. The URL is "https//aws.amazon.com/jp/rekognition/the-facts-on-facial-rec ognition-with-artificial-intellgence/". However, as the external face recognition processing site computer and face recognition processing program, software of other companies, for example, IBM Corporation or Google Corporation, which provide similar face recognition service, can be adopted.

As the face recognition. application AP1 installed and used in the local site computer 2, face recognition program using machine-learning and image-recognition libraries of Dlib, which is a general-purpose cross-platform software library.

Second Embodiment

Figure 9:
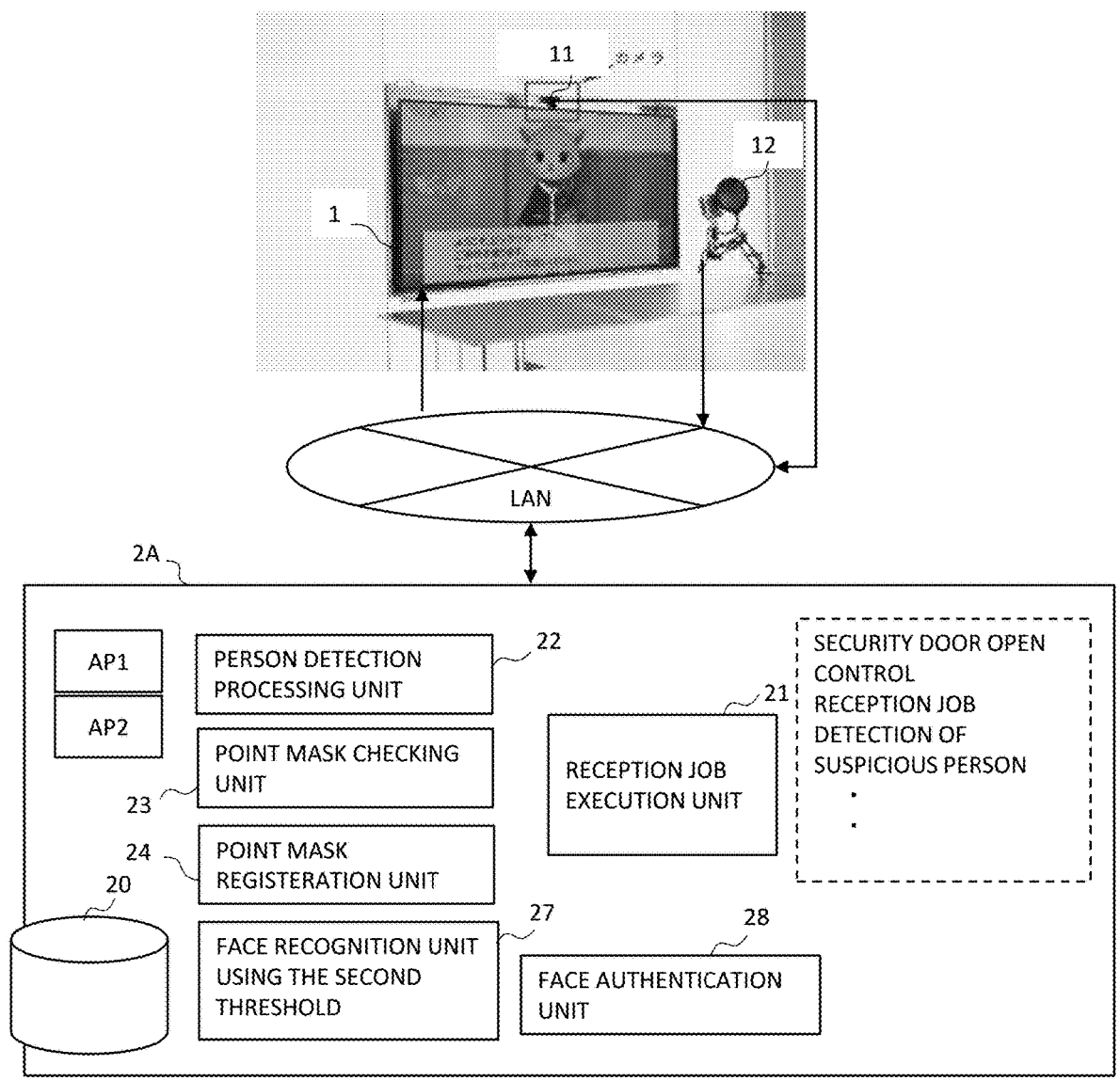
FIG. 9 is a functional block diagram of an automatic reception system according to a second embodiment of the present invention.
Figure 10:
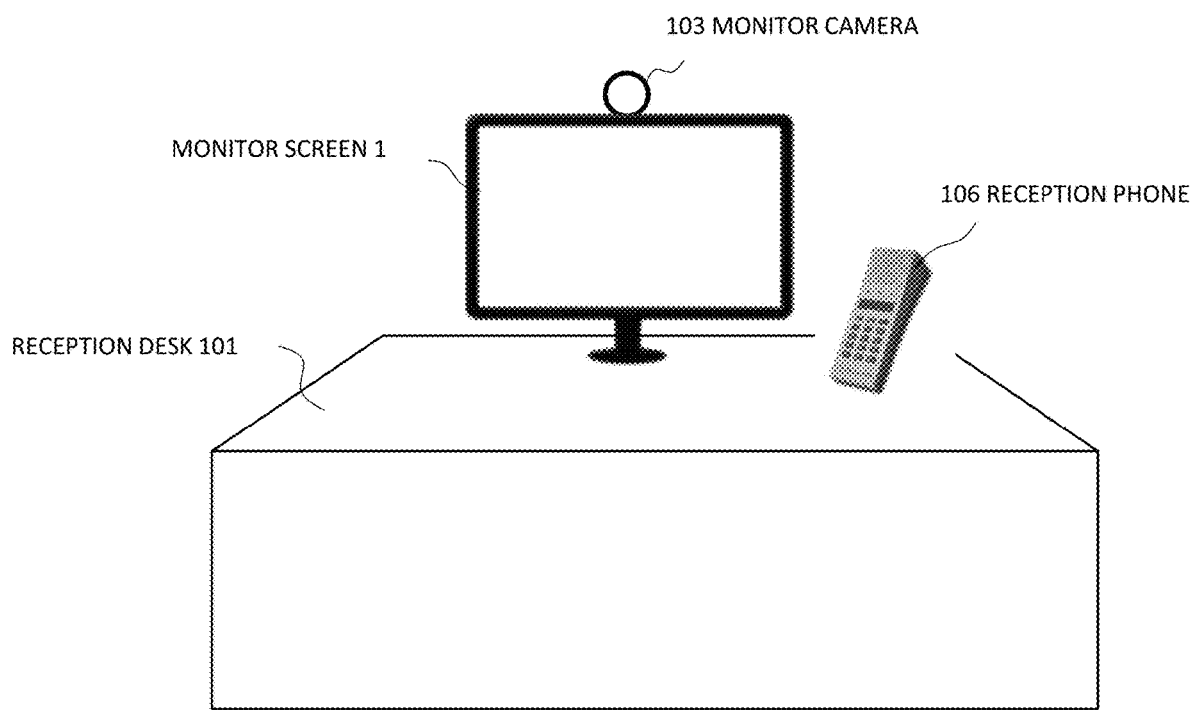
FIG. 10 is an explanatory diagram of an automatic reception. booth of a conventional automatic reception system.

An automatic reception system according to the second embodiment of the present invention will be described with reference to FIG. 9. In the case of the first embodiment shown in FIG. 1, an image of the face detection region is transmitted to an external face recognition/authentication site computer 3 which provides highly accurate face recognition and face authentication service The automatic reception system according to the present embodiment can simultaneously execute a face detecting application APT based on a first threshold value having a low accuracy but a high recognition speed in the local site computer 2A and an authentication application AP2 for performing face recognition and face authentication based on a second threshold value having a high face recognition accuracy. In the automatic reception system of the second embodiment, it is provided in the local site computer 2A a reception job execution unit 21 for executing the automatic reception task similar to the first embodiment, a person detection processing unit 22 for executing the person detection based on the first threshold value, a point mask checking unit 23, and a point mask registration unit 24. This second embodiment is characterized in that a face recognition processing unit 27 based on a second threshold value for executing face recognition processing based on a second threshold value and a face authentication processing unit 28 for executing face authentication based on a face recognition result of the face recognition processing unit 27 based on the second threshold value are provided both in the local site computer 2A.

Figure 2:
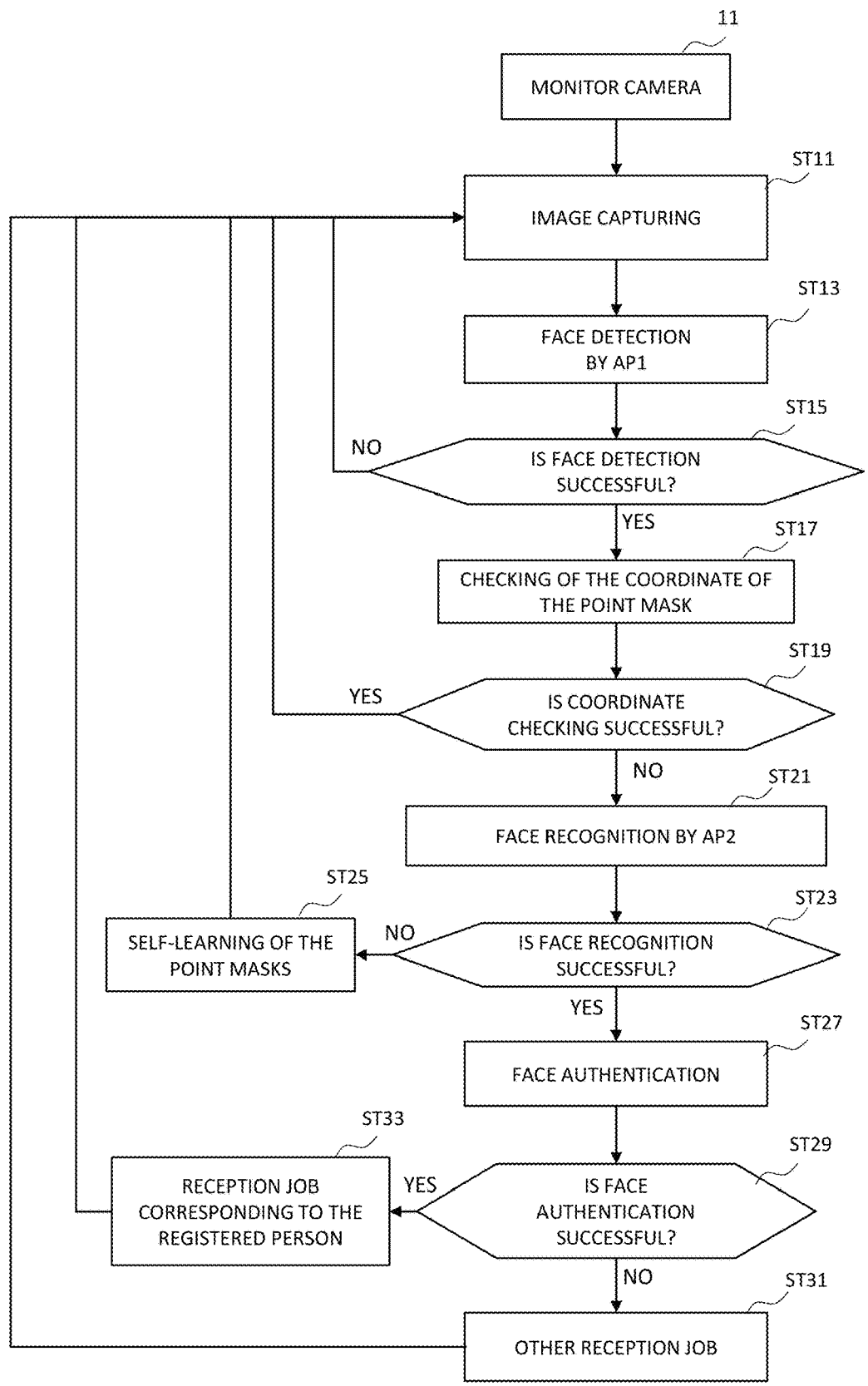
FIG. 2 is a flowchart of an automatic reception operation executed by the automatic reception system according to the first embodiment.

The automatic reception operation by the automatic reception system according to the second embodiment is almost the same as that of the first embodiment, and the processing of the flowchart of FIG. 2 is also executed. However, since face detection by the first threshold value, face recognition with higher accuracy by the second threshold value, and face authentication are executed solely in the local site computer 2A, the registration process of the face images of the sequences SQ3 and SQ5 in the sequence of FIG. 3 and the processing of the sequences SQ29, SQ31 and SQ37 in the sequence of FIG. 4 are carried out in the local site computer 2A.

The automatic reception system of the second embodiment can also exhibit the same operation and effects as those of the first embodiment. In other words, it can determine in the first stage whether a "person" coming close to the system is captured or merely a background is captured in the captured image of a whole entrance hall scene, and perform self-learning of the elements in the background that cause erroneous face recognition during the operation of this system. And further, when the same element as the erroneous recognition element existing in the self-learned background is erroneously detected as a person's face region again with respect to the captured image of the camera, the face region detection is not shifted to the face recognition process. As a result, the automatic reception processing can be performed by shifting to the face authentication process only in the case of successful detection of an actual person's face region, and the flow from the detection processing of a person approaching to the face authentication processing of the person can be smoothly performed while detecting the person approaching at high speed. So, the face recognition system of the second embodiment can quickly detect a person approaching the reception counter and correctly execute the proper reception processing without setting a screen panel in front of the camera as a background, limiting the region for face detection, or instructing visitors to move to the best position to be viewed from the camera.

In this second embodiment, it is possible to employ a. machine learning library, and libraries of image recognition, one is an image recognition library with a short processing time but a relatively low precision (low threshold) and the other is an image recognition library with a relatively high precision and a long processing time (high threshold) from the general-purpose cross-platform software library Dlib.

Other Embodiments

In the first and second embodiments, the automatic reception system has been described. However, the face recognition method and the face recognition program of the present invention and the face recognition system having the processing function thereof are not limited to the automatic reception technology. It can also be widely applicable to an entrance/exit management system to be installed in an entrance hall of a condominium or the like in which opening/closing of a security door needs to be controlled while identifying a specific person such as a resident of the condominium, a visitor, a suspicious person, and the like.

INDUSTRIAL APPLICABILITY

This system can be widely used as an automatic reception system and an entrance/exit management system in an entrance hall of business facilities or condominiums.

EXPLANATION OF REFERENCE NUMERALS

1 Reception monitor
2 and 2A Local site computer
3 Face authentication site computer
11 Monitor camera
20 Storage
21 Reception job execution unit
22 Person detection processing unit
23 Point mask checking unit
24 Point mask registration unit
25 Face image transmission unit
26 Face authentication result receiving unit
27 Face recognition processing unit of second threshold
28 Face authentication processing unit
30 Storage
LAN Local Area Network
Internet

The invention claimed is:

1. A face recognition system comprising: a monitor camera for continuously capturing a plurality of captured images of a given monitoring space at a given angle of view; a first face recognition processing unit for continuously performing face recognition by using a first threshold value to detect a face region on each of the captured images, and transmitting each of the captured images on which the face region has been detected; a second face recognition processing unit for performing face recognition to detect a face image by using a second threshold value which is higher than the first threshold value on each of the captured images transmitted from the first face recognition processing unit; a coordinate of barycentric position determining unit for determining a coordinate of a barycentric position of each of the detected face regions which were detected by the first face recognition processing unit; a point mask learning unit for, when the second face recognition processing unit cannot recognize a face image on one of the captured images transmitted from the first face recognition processing unit, storing the coordinate of the barycentric position determined by the barycentric position determining unit as a new point mask coordinate data into a storage device; a point mask check processing unit for, when the first face recognition processing unit detects a face region on one of the captured images, checking if there is a same coordinate data with the coordinate of the barycentric position determined by the coordinate of barycentric position determining unit among the point mask coordinates stored in the storage, and in a case when the same coordinate data is found, stopping the first face recognition processing unit from transmitting the captured image on which the face region has been detected to the second face recognition processing unit; a face recognition result output unit for outputting a face recognition result when the second face recognition processing unit successfully recognizes a face; and an automatic reception processing unit for displaying on a monitor screen a welcome message corresponding to a face detection by the first face recognition processing unit and a welcome message corresponding to an attribute of a person specified by a face authentication processing unit.

2. The face recognition system as claimed in claim 1, further comprising: the monitor screen installed in a reception booth with the monitor camera and connected with this face recognition system; the face authentication processing unit for specifying a person using a face recognition result output from the face recognition result output unit.

3. The face recognition system as claimed in claim 2, wherein the automatic reception processing unit is configured to output an open signal of a security door according to the attribute of the person specified by the face authentication processing unit.

4. The face recognition system as claimed in claim 1, wherein a computer of an external face recognition service site connected via the Internet is used as the second face recognition processing unit.

5. A face recognition method to be executed by a computer, wherein the method comprising: a camera image capturing step in which a monitor camera continuously captures a plurality of captured images of a given monitoring space at a given angle of view; a first face recognition processing step for continuously performing face recognition by using a first threshold value to detect a face region on each of the captured images, and transmitting each of the captured images on which the face region has been detected; a second face recognition processing step for performing face recognition in order to detect a face image by using a second threshold value which is higher than the first threshold value on each of the captured images transmitted from the first face recognition processing step; a coordinate of barycentric position determining step for determining a coordinate of a barycentric position of each of the detected face regions which were detected by the first face recognition processing step; a point mask learning step for, when the second face recognition processing step cannot recognize a face image on one of the captured images transmitted from the first face recognition processing step, storing the coordinate of the barycentric position determined by the barycentric position determining step as a new point mask coordinate data into a storage device; a point mask check processing step for, when the first face recognition processing step detects a face region on one of the captured images, checking if there is a same coordinate data with the coordinate of the barycentric position determined by the coordinate of barycentric position determining step among the point mask coordinates stored in the storage device, and in a case when the same coordinate data is found, stopping the first face recognition processing step from transmitting the captured image on which the face region has been detected to the second face recognition processing step; a face recognition result output step of outputting a face recognition result when the second face recognition processing step successfully recognizes a face and an automatic reception processing step of displaying on a monitor screen a welcome message corresponding to the face detection by the first face recognition processing step and a welcome message corresponding to an attribute of a person specified by a face authentication processing step.

6. The face recognition method as claimed in claim 5, further comprising: the face authentication processing step of specifying a person by using the face recognition result output.

7. The face recognition method as claimed in claim 6, wherein the automatic reception processing step outputs an open signal of a security door according to the attribute of the person specified in the face authentication processing step.

8. The face recognition method as claimed in claim 5, wherein, in the second face recognition processing step, a computer of an external face recognition service site connected via the Internet is used for performing face recognition on each of the transmitted captured images.

9. A non-transitory computer-readable medium containing program instructions for face recognition, wherein execution of the program instructions by one or more processors of a computer system causes the one or more processors to carry out: a camera image capturing step in which a monitor camera continuously captures a plurality of captured images of a given monitoring space at a given angle of view; a first face recognition processing step for continuously performing face recognition by using a first threshold value to detect a face region on each of the captured images, and transmitting each of the captured images on which the face region has been detected; a second face recognition processing step for performing face recognition in order to detect a face image by using a second threshold value which is higher than the first threshold value by using a second threshold value which is higher than the first threshold value on each of the captured images transmitted from the first face recognition processing step; a coordinate of barycentric position determining step for determining a coordinate of a barycentric position of each of the detected face regions which were detected by the first face recognition processing step; a point mask learning step for, when the second face recognition processing step cannot recognize a face image on one of the captured images transmitted from the first face recognition processing step, storing the coordinate of the barycentric position determined by the barycentric position determining step as a new point mask coordinate data into a storage device; a point mask check processing step for, when the first face recognition processing step detects a face region on one of the captured images, checking if there is a same barycentric coordinate data with the coordinate of the barycentric position determined by the coordinate of barycentric position determining step among the point mask coordinate data stored in the storage device, and in a case when the same coordinate data is found, stopping the first face recognition processing step from transmitting the captured image on which the face region has been detected to the second face recognition processing step; a face recognition result output step of outputting a face recognition result when the second face recognition processing step successfully recognizes a face and an automatic reception processing step of displaying on a monitor screen a welcome message corresponding to the face detection by the first face recognition processing step and a welcome message corresponding to an attribute of a person specified by a face authentication processing step.

10. The non-transitory computer-readable medium as claimed in claim 9, further comprising: the face authentication processing step of specifying a person by using the face recognition result output.

11. The non-transitory computer-readable medium as claimed in claim 10, wherein, the automatic reception processing step outputs an open signal of a security door according to the attribute of the person specified in the face authentication processing step.

12. The non-transitory computer-readable medium as claimed in claim 9, wherein, in the second face recognition processing step, a computer of an external face recognition service site connected via the Internet is used for performing face recognition on each of the transmitted captured images.

\* \* \* \* \*